Jan. 13, 1925.  
E. M. GLASGOW  
COUPLING DEVICE  
Filed Feb. 20, 1924  
1,522,622  
2 Sheets-Sheet 1

INVENTOR  
Ernest M. Glasgow.  
BY  
Townsend + Decker  
ATTORNEYS.

Jan. 13, 1925.

E. M. GLASGOW 1,522,622

COUPLING DEVICE

Filed Feb. 20, 1924

INVENTOR
Ernest M. Glasgow.
BY
Townsend & Decker
ATTORNEYS

Patented Jan. 13, 1925.

1,522,622

UNITED STATES PATENT OFFICE.

ERNEST M. GLASGOW, OF PORT CHESTER, NEW YORK, ASSIGNOR TO RUSSELL & STOLL COMPANY, OF NEW YORK, N. Y., A CORPORATION OF NEW YORK.

COUPLING DEVICE.

Application filed February 20, 1924. Serial No. 693,965.

*To all whom it may concern:*

Be it known that I, ERNEST M. GLASGOW, a citizen of the United States, and a resident of Port Chester, in the county of Westchester and State of New York, have invented certain new and useful Improvements in Coupling Devices, of which the following is a specification.

My invention relates to a coupling device for coupling rotatable shafts or other rotatable devices at will so that they may be caused to turn together on the application of power to either or may be uncoupled and thus be permitted to turn independently of one another.

The invention consists essentially in providing the said shafts or other members with slotted heads, the slots of which are located in and extend diametrically across the faces of the heads opposed to one another, and in mounting in the space between said heads a coupling member comprising essentially a pin or bar the ends of which enter and are movable longitudinally in said slots from a position coincident with the common axes of rotation of the two shafts (in which position the shafts and heads may turn independently of one another) into a position eccentric thereto to cause the shafts to be coupled through the pin and to turn together. Preferably the pin or similar device is mounted in a shiftable frame which may be shifted from a position in which the shafts are uncoupled to a position for coupling the same or vice versa as will be presently described.

The invention further consists in the provision of two pins one of which is always located in the slots while the other is normally disengaged from the slots when the shafts are uncoupled and may be moved into the slots at one end thereof when a coupled condition is to be established.

The accompanying drawings illustrate in:

Fig. 1 in plan view a form of device embodying my invention.

Figure 4:
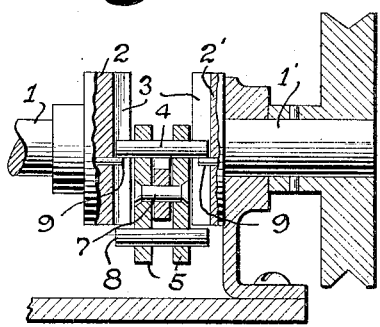
Fig. 4 is an end elevation and partially vertical section of the device.
Figure 3:
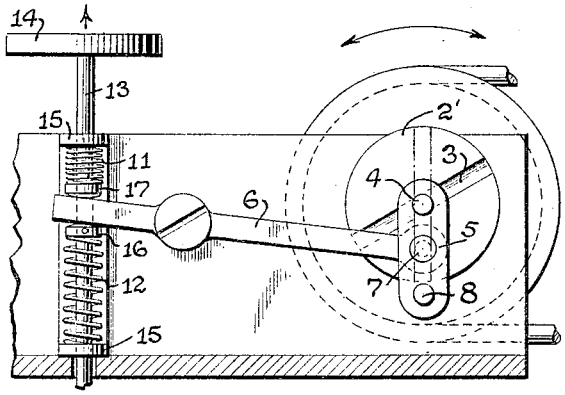
Fig. 3 shows the position of the coupling member when the two shafts are uncoupled.

The shafts or members to be mechanically coupled are indicated at 1, 1', said shafts being arranged as shown in line with one another. The shafts respectively are provided with slotted heads 2, 2' at their opposed ends and in the space between said heads the coupling member to be presently described is mounted. Each head is provided in its face with a diametrical slot 3. Movable longitudinally of said slots is a pin or bar 4 the ends of which project into the slots in the heads. In their normal position as indicated in Figs. 3 and 4 they are in line with the common axes of rotation of the shafts 1, 1'. In this position the shafts and heads may turn independently of one another around the bar or pin as a center and neither can communicate motion to the other. If the pin or bar be moved in the slots away from said coaxial position to a position eccentric to the axes of rotation of the shafts the movement of one head will be communicated to the other head through the pin 4, acting now as a coupling bar, pin or member.

Figure 1:
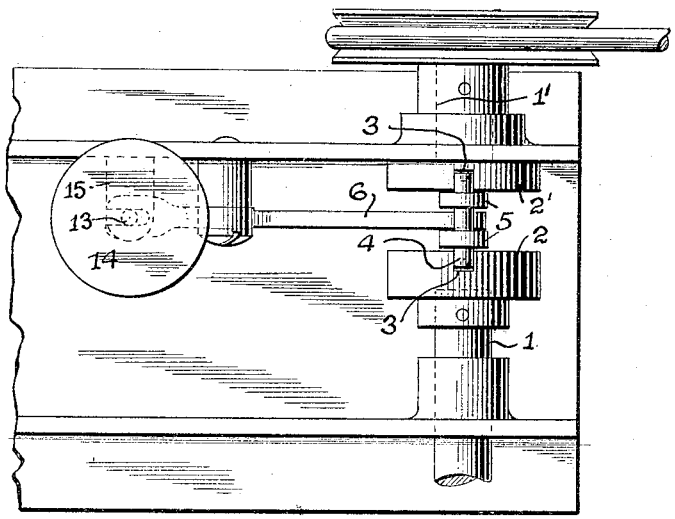
Figure 2:
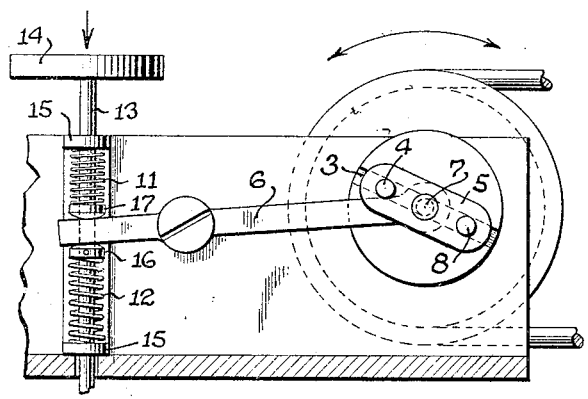
Fig. 2 shows the coupling member in side elevation in coupling position.

At 5 is indicated a bisected frame or carrier in which the pin may be mounted. Said carrier may be moved in the space between the heads to change the position of the pin in any desired manner as for instance by a lever 6 whose end is connected to the frame 5 to lift or depress the same. The connection between the lever and frame may consist of a pin 7 which passes through the end of the lever 6 and has a bearing in the frame or member 5. The pin 4 is at all times engaged in the slots. A single pin or lug 4 may be used as the coupler or if desired an additional pin 8 may be used mounted like the pin 4 but normally in position outside the ends of the slots 3 as shown in Fig. 4. When the pin 4 is lifted from the position indicated in Figs. 3 and 4 to a position such as indicated in Fig. 2, the pin 8 enters the lower ends of the slots and forms additional coupling means. In the normal or uncoupled condition of the shafts or heads the pin 4 permits free turning of both members 1, 1' since said members will turn around the pin 4 as a center, but when the slots are in alignment and the pin is lifted away from the center and the pin 8 is also moved into the slots and occupies also an eccentric position as shown in Fig. 2, the heads will be effectually coupled by the two pins which now engage the sides of the slots off the center of rotation.

Provision may be made either to allow a complete or continuous rotation or turning movement of the members to be coupled or a limited rocking movement only may be permitted. This limitation of movement occurs when the arm 6 is entered between the two portions of the member 5, as in the construction shown, and when the pin extends through members 5 from side to side so that on a partial rotation of the intermediate member 5 the pin will engage and lock against said lever 6. Suitable stops may be provided in the heads and within the slots to limit the movement of the pin 4, and cause it to rest in position co-axial with the axes of rotation of the heads. Such stops are indicated at 9.

As will be seen, the ends of the pin 4 constitute in effect a pair of lugs rigidly connected to one another so that the heads will be coupled as soon as the lugs are moved in the slots away from the center of rotation. Hence, as will be obvious, the term "pin" or "bar" as used herein is to be taken in a general sense as including any similar construction which provides a practically rigid member between the heads entering by lugs or projections into the slots and movable longitudinally of said slots by suitable adjusting devices away from the center of rotation of the slotted heads.

The device, such as lever 6, for throwing the coupling member into and out of operative relation to the rotating heads is actuated in opposite directions respectively by the differential springs 11 and 12 controlled in their action by a plunger 13 having an enlarged head 14 adapted to be engaged by any actuating device. The plunger 13 works and is guided in the guides 15, and the springs 11 and 12 are preferably coiled springs surrounding the plunger. The lower spring 12 is the stronger spring and acts to lift the lever 6 and throw the clutch into inoperative relation or position through a collar 16 fixed to the plunger. When the plunger is depressed to lower the collar 16, the spring 12 is compressed and the lever is freed from the action of said spring 12. The upper spring 11, which is the weaker spring, then actuates the lever 6 to throw the coupling into operative relation by means of the collar 17 which is loose on the plunger 13.

When, therefore, the plunger is depressed, the coupling member will be operated to couple the rotatable members by the action of the lighter spring 11 and the coupling will retain its coupling position so long as the spring 11 is permitted to act. When pressure upon the head 14 of the plunger is relieved and the plunger is left free to the action of the stronger spring 12, the latter will overcome the action of the spring 11 and will throw the coupling device into position for uncoupling the rotatable heads.

Figure 5:
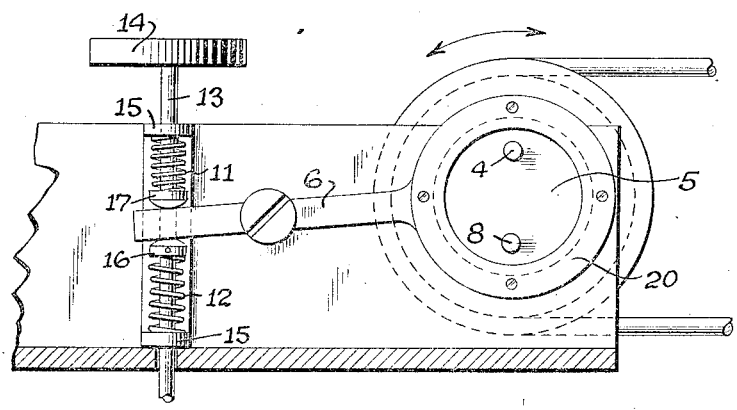
Fig. 5 is a side elevation and Fig. 6 is a vertical cross-section on the line of the slots in the heads.
Figure 6:
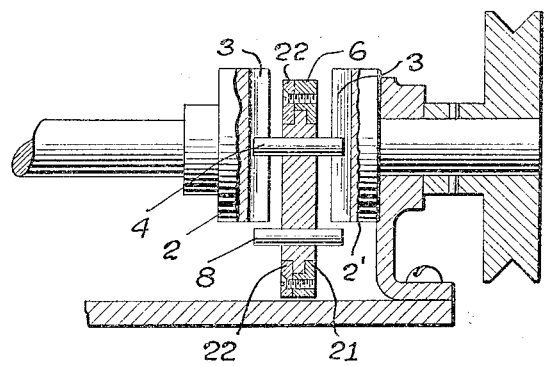

In the modification illustrated in Figs. 5 and 6 the lever 6 or other shifting mechanism is connected to the coupling member in such manner as to permit continuous rotation of the coupled parts. As shown in these figures, the carrier or frame 5 from which the pin ends or lugs project is circular or cylindrical in form on its edge and is capable of turning in a cylindrical bearing 20 formed in the end of the lever 6. The frame or carrier in this instance is shown as solid and its circumferential edge is held between the flange 21 on the end of lever 6 and the detachable plate 22. Said rotating frame or carrier might however be mounted in other ways in the lever 6 so as to be supported by its edge and to be capable of free and continuous rotation thereon.

What I claim as my invention is:—

1. The combination with a pair of co-axially rotatable heads having diametrical slots in their opposed faces extending transversely to the axes of rotation and a coupling member consisting of a pin projecting into said slots and movable in said slots longitudinally thereof from a position in said slots coincident with said axes of rotation wherein the heads may rotate around the pin as a fixed center to another position in said slots eccentric thereof to couple and rotate with said heads and vice versa.

2. The combination with a pair of co-axially rotating heads having slots in their opposed faces extending transversely to their axes of rotation, and a coupling member comprising essentially a pair of lugs rigidly connected with one another and movable in said slots longitudinally thereof from a position coincident with said axes of rotation to a position eccentric thereof and vice versa and stops in said slots for limiting the movement of said lugs to cause them to come to rest in a position coinciding with the axes of rotation of the heads.

3. The combination with a pair of co-axially rotatable heads having slots in their opposed faces extending transversely to their axes of rotation, and a coupling member comprising essentially a pair of lugs rigidly connected with one another and movable in said slots longitudinally thereof from a position in said slots coincident with said axes of rotation where both heads may rotate around said lugs as a center to a position in said slots to one side of the center to couple the heads and vice versa.

4. A coupling device comprising in combination a pair of co-axially rotating heads having diametrical slots extending across their faces through their center of rotation and a coupling member consisting essentially of a pair of lugs rigidly connected with one another and movable in the slots from a position where the lugs are coincident with the axes of rotation to a position in the slots to one side of the axis of rotation where they will act to couple the heads.

5. A coupling device comprising in combination a pair of co-axially rotating heads having diametrical slots extending across their faces through their center of rotation and a coupling member consisting essentially of a pair of lugs rigidly connected with one another and movable in the slots from a position where the lugs are coincident with the axes of rotation to a position in the slots where they are located to one side of the axes of rotation, thereby coupling the heads and means for limiting the movement of the lugs in the slots to bring them to rest in said central position.

6. In a coupling device, the combination with two slotted rotatable heads having diametrical slots in their opposed faces, of a coupling member comprising essentially two pairs of lugs, one pair continually engaged in the slots and the other pair normally disengaged from the slots, and means for moving said pairs of pins longitudinally of the slots to bring the latter pair into the slots and move the former pair into a position eccentric to the axis of rotation of the heads.

7. In a shaft coupling device, the combination of two slotted heads having their slots disposed in their opposing faces and extending across their common axes of rotation and a coupling device comprising a pin extended across the space between the heads and entering the slots at its ends and a frame or movable member carrying said pin and movable transversely to the axis of rotation of the heads to move said pin into and out of a position co-axial with the common axes of rotation of the heads.

8. In a shaft coupling device, the combination of a coupling member and operating lever therefor, of a plunger, two springs acting respectively on said lever in opposite directions, a collar fixed on the plunger for compressing the stronger spring to allow the lighter spring to act and a collar loose on the plunger through which the lighter spring engages said lever.

9. In a shaft coupling device, the combination of a pair of co-axial rotatable heads having diametrical slots in their opposed faces, a coupling member comprising essentially a pair of lugs rigidly connected with one another and movable in the slots from a position coincident with the axes of rotation of the members to a position eccentric thereto, a pair of springs of different power opposing one another's action, intermediate mechanism through which said springs act upon said coupling member and means for compressing and relieving pressure upon the stronger spring to allow the lighter spring to act and throw the coupling member into one position or to allow the stronger spring to act and overcome the lighter and thereby throw the coupling member to another position.

10. In a coupling device, the combination of a pair of heads having diametrical slots in their opposed faces, a coupling member provided with two pairs of lugs engaging in said slots and one pair adapted to be moved into and out of a position of coincidence with the axes of rotation of the slotted heads, the other movable into and out of the ends of the slots, and an actuating spring operating on the coupling member for throwing the same into a position to couple the heads.

Signed at New York, in the county of New York and State of New York this 19th day of February, A. D. 1924.

ERNEST M. GLASGOW.